(12) United States Patent
Yonetsu et al.

(10) Patent No.: US 8,986,839 B2
(45) Date of Patent: *Mar. 24, 2015

(54) METAL-CONTAINING PARTICLE AGGREGATE, METAL-CONTAINING PARTICLE COMPOSITE MEMBER, AND METHOD OF MANUFACTURING THE AGGREGATE AND THE COMPOSITE MEMBER

(75) Inventors: Maki Yonetsu, Tokyo (JP); Tomohiro Suetsuna, Kanagawa (JP); Kouichi Harada, Tokyo (JP); Seiichi Suenaga, Kanagawa (JP); Yasuyuki Hotta, Tokyo (JP); Toshihide Takahashi, Kanagawa (JP); Tomoko Eguchi, Tokyo (JP); Mutsuki Yamazaki, Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 321 days.

This patent is subject to a terminal disclaimer.

(21) Appl. No.: 13/216,619

(22) Filed: Aug. 24, 2011

(65) Prior Publication Data

US 2012/0049100 A1    Mar. 1, 2012

(30) Foreign Application Priority Data

Aug. 27, 2010 (JP) ................................ 2010-191341
Mar. 18, 2011 (JP) ................................ 2011-060450

(51) Int. Cl.
| B05D 3/06 | (2006.01) |
| B05D 3/10 | (2006.01) |
| H01F 1/08 | (2006.01) |
| H01F 1/047 | (2006.01) |
| H01F 41/02 | (2006.01) |

(52) U.S. Cl.
USPC ........... 428/403; 428/404; 428/405; 428/406; 428/407; 427/212

(58) Field of Classification Search
USPC ................................. 428/403–407; 427/212
IPC ................ H01F 1/08,1/047, 41/02; B05D 3/06, B05D 3/10
See application file for complete search history.

(56) References Cited

U.S. PATENT DOCUMENTS

| 7,700,194 | B2 | 4/2010 | Suetsuna et al. | |
| 7,713,641 | B2 * | 5/2010 | Yonetsu et al. | 428/836.1 |
| 7,714,793 | B2 * | 5/2010 | Eguchi et al. | 343/787 |
| 7,740,939 | B2 * | 6/2010 | Harada et al. | 428/403 |
| 7,763,094 | B2 | 7/2010 | Suetsuna et al. | |
| 7,936,310 | B2 * | 5/2011 | Aiga et al. | 343/787 |
| 8,289,222 | B2 * | 10/2012 | Suetsuna et al. | 343/787 |
| 8,305,281 | B2 * | 11/2012 | Suetsuna et al. | 343/787 |
| 8,475,922 | B2 * | 7/2013 | Suetsuna et al. | 428/403 |
| 2006/0068196 | A1 | 3/2006 | Suenaga et al. | |
| 2006/0214855 | A1 | 9/2006 | Harada et al. | |
| 2008/0220231 | A1 | 9/2008 | Suetsuna et al. | |
| 2009/0295650 | A1 | 12/2009 | Higaki et al. | |
| 2009/0295662 | A1 | 12/2009 | Suetsuna et al. | |
| 2010/0060538 | A1 | 3/2010 | Suetsuna et al. | |
| 2010/0060539 | A1 * | 3/2010 | Suetsuna et al. | 343/787 |
| 2011/0217543 | A1 | 9/2011 | Suetsuna et al. | |

FOREIGN PATENT DOCUMENTS

| JP | 1-255605 A | 10/1989 |
| JP | 8-109401 | * 4/1996 |
| JP | 2006-97123 | 4/2006 |
| JP | 2007-194273 | 8/2007 |
| JP | 2009-239153 A | 10/2009 |
| JP | 2009-302504 A | 12/2009 |
| JP | 2010-87462 | 4/2010 |

OTHER PUBLICATIONS

Office Action issued Apr. 23, 2013 in Japanese Patent Application No. 2011-060450 (with English language translation).
Office Action issued Jul. 2, 2013 in Japanese Patent Application No. 2011-060450 (with English language translation).
U.S. Appl. No. 13/216,619, filed Aug. 24, 2011, Yonetsu et al.
U.S. Appl. No. 13/259,856, filed Sep. 23, 2011, Yonetsu et al.
U.S. Appl. No. 13/597,885, filed Aug. 29, 2012, Suetsuna et al.
U.S. Appl. No. 13/597,989, filed Aug. 29, 2012, Harada et al.
Office Action issued Sep. 18, 2012 in Japanese Application No. 2011-060450 (With English Translation).
Chinese Office Action issued Nov. 1, 2013, in China Patent Application No. 201110248631.1 (with English translation).
Office Action issued Apr. 1, 2014 in Japanese Patent Application No. 2012-253035 with English language translation.
Office Action issued Sep. 11, 2014, in corresponding Chinese Patent Application 201110248631.1 (with English-language Translation).
Office Action issued Jan. 27, 2015, in corresponding Japan Application 2012-253035 (with English-language Translation).

* cited by examiner

Primary Examiner — Leszek Kiliman
(74) Attorney, Agent, or Firm — Oblon, Spivak, McClelland, Maier & Neustadt, L.L.P.

(57) ABSTRACT

A metal-containing particle aggregate of an embodiment of the present invention includes a plurality of core-shell particles. Each of the core-shell particles includes: a core portion that contains at least one magnetic metal element selected from the first group consisting of Fe, Co, and Ni, and at least one metal element selected from the second group consisting of Mg, Al, Si, Ca, Zr, Ti, Hf, Zn, Mn, rare-earth elements, Ba, and Sr; and a shell layer that includes a carbon-containing material layer and an oxide layer that covers at least part of the core portion and includes at least one metal element that belongs to the second group and is contained in the core portion.

16 Claims, 2 Drawing Sheets

METAL-CONTAINING PARTICLE AGGREGATE, METAL-CONTAINING PARTICLE COMPOSITE MEMBER, AND METHOD OF MANUFACTURING THE AGGREGATE AND THE COMPOSITE MEMBER

CROSS-REFERENCE TO RELATED APPLICATION

This application is based upon and claims the benefit of priority from the prior Japanese Patent applications No. 2010-191341, filed on Aug. 27, 2010, and No. 2011-060450, filed on Mar. 18, 2011, the entire contents of which are incorporated herein by reference.

FIELD

Embodiments described herein relate to a metal-containing particle aggregate, a metal-containing particle composite member, and methods of manufacturing the aggregate and the composite member.

BACKGROUND

In recent years, magnetic materials have been used in electromagnetic wave absorbers, magnetic inks, and devices such as inductance devices, and have been gaining importance year by year in that field. On the other hand, the frequency bands used by devices involving magnetic materials have been becoming higher and higher in recent years. To cope with radio waves in such high frequency range, the energy loss and the transmission loss need to be small in each electronic component.

In view of that, fine particles of metals that are high-permeability magnetic materials have been considered for use as the magnetic materials. Such metal fine particles are mixed with a binder such as a resin, and are formed into a composite member to be used in a device. Metal fine particles sometimes adhere to one another when processed.

DESCRIPTION OF EMBODIMENTS

A metal-containing particle aggregate of an embodiment includes a plurality of core-shell particles. Each of the core-shell particles includes: a core portion that contains at least one magnetic metal element selected from the first group consisting of Fe, Co, and Ni, and at least one metal element selected from the second group consisting of Mg, Al, Si, Ca, Zr, Ti, Hf, Zn, Mn, rare-earth elements, Ba, and Sr; and a shell layer that includes an oxide layer that covers at least part of the core portion and includes at least one metal element that belongs to the second group and is contained in the core portion. The shell layer may also include a carbon-containing material layer.

The embodiment efficiently prevents aggregation of metal fine particles.

The following is a description of embodiments, with reference to the accompanying drawings.

[First Embodiment: Metal-Containing Particle Aggregate]

(Metal-Containing Particle Aggregate)

A metal-containing particle aggregate of this embodiment is an aggregate formed by core-shell particles each including a core portion forming the core of the particle, and a coating layer (a shell layer) coating at least part of the surface of the core portion.

The above particle aggregate may contain oxide particles, as well as the core-shell particles. The oxide particles may be formed when the later described oxide layers are detached from the core-shell particles. The oxide particles each contain the same second-group element as that contained in the core portions and the oxide layers, as described later. Where the oxide layers are not detached from the core-shell particles, the metal-containing particle aggregate may not contain oxide particles.

Figure 1B:
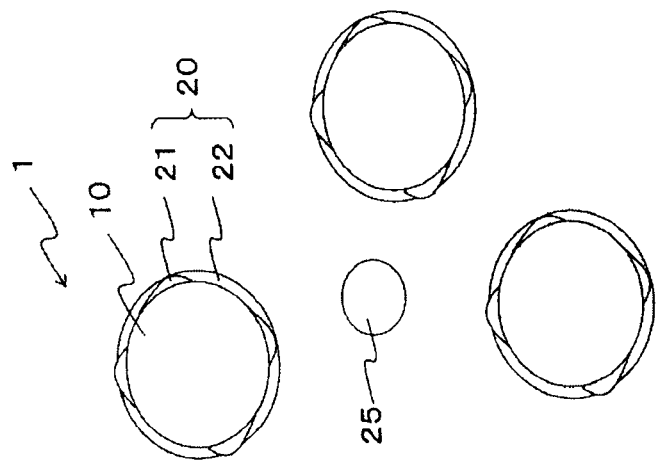
FIGS. 1A and 1B are enlarged cross-sectional views of first particle aggregates.
Figure 1A:
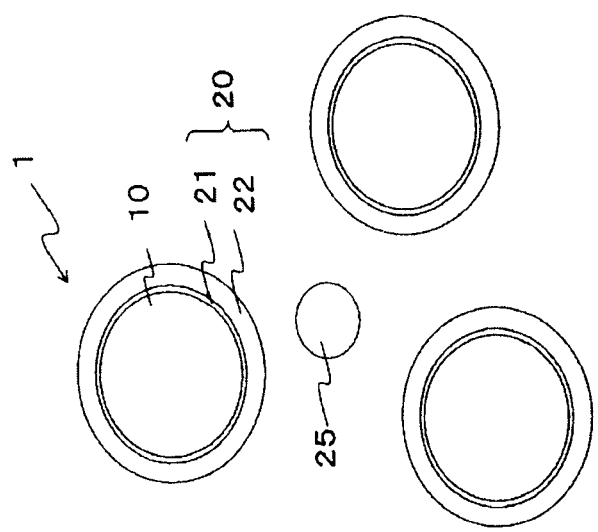

An example of the metal-containing particle aggregate of this embodiment includes oxide layers 21 covering core portions 10, and carbon-containing material layers 22 covering the oxide layers 21, as shown in FIG. 1A, which is a conceptual cross-sectional view of the metal-containing particles. The portions formed by combining the oxide layers 21 and the carbon-containing material layers 22 are shell layers 20. Alternatively, as shown in FIG. 1B, the shell layers 20 covering the core portions 10 may be mixed layers of the oxide layers 21 and the carbon-containing material layers 22. However, the core-shell particles are not limited to the above forms, and may be in various other forms. Where the oxide layers 20 are formed so that the core portions 10 are not in contact with each other, the carbon-containing material layers 22 may not be formed. In such a case, the content ratio of the magnetic metal in the metal-containing particle aggregate becomes higher, and the magnetic properties are improved accordingly.

The shapes of the core-shell particles are now described. Each of the core-shell particles may have a spherical shape, but preferably have a flat shape or a rod-like shape with a high aspect ratio (10 or higher, for example). The rod-like shape may be a spheroid. Here, the "aspect ratio" indicates the ratio between the height and the diameter (the height/the diameter). Where each of the core-shell particles has a spherical shape, the height and the diameter are equal to each other, and accordingly, the aspect ratio is 1. The aspect ratio of a flat particle is "the diameter/the height." The aspect ratio of a rod-like particle is "the length of the rod/the diameter of the bottom face of the rod." However, the aspect ratio of a spheroid is "the long axis/the short axis."

By making the aspect ratio higher, magnetic anisotropy depending on shapes can be provided, and the high-frequency properties of the magnetic permeability can be improved. Furthermore, the core-shell particles can be readily oriented by a magnetic field when integrated and formed into a desired member, and the high-frequency properties of the magnetic permeability can be further improved. Also, by making the aspect ratio higher, the limit particle size for the core portions to be single-domain structures can be made greater, for example, more than 50 nm. Where the core portions each have a spherical shape, the limit particle size for the core portions to be single-domain structures is approximately 50 nm.

Flat core-shell particles with a high aspect ratio can each have a large limit particle size, and the high-frequency properties of the magnetic permeability are not degraded. In general, particles with a larger particle size are easier to be processed. Therefore, a high aspect ratio is considered advantageous, from a manufacturing standpoint. Further, when a desired member is made from core-shell particles, the filling rate can be made higher by making the aspect ratio higher. Accordingly, the saturation magnetization per volume and per mass can be made greater in the member. As a result, the magnetic permeability can also be made higher.

It should be noted that the mean particle size of core-shell particles can be determined as follows. Through TEM (Transmission Electron Microscopy) observations and SEM (Scanning Electron Microscopy) observations, the particle size of each of the particles is calculated as the mean value of the longest diagonal line and the shortest diagonal line of the particle. The mean particle size of core-shell particles can be determined from the mean value of a large number of particle sizes.

(Core Portion)

The core portions of the above described metal-containing particles contain at least one magnetic metal element selected from the first group consisting of Fe, Co, and Ni (a first-group metal element), and at least one metal element selected from the second group consisting of Mg, Al, Si, Ca, Zr, Ti, Hf, Zn, Mn, rare-earth elements, Ba, and Sr (a second-group metal element).

As the core portions contain a first-group magnetic metal element, the metal-containing particle aggregate can have a higher magnetic permeability. Meanwhile, an oxide of a second-group metal element has a small standard Gibbs energy of formation, and is readily oxidized. Accordingly, the second-group element existing near the surfaces of the core portions easily forms the oxide layers 21. As the oxide layers 21 contain the second-group element, the insulating properties of the metal-containing particle aggregate become stable.

The magnetic metal (the first-group metal element) contained in the core portions may be a single metal element, but may also be an alloy. Particularly, an Fe-based alloy, a Co-based alloy, a FeCo-based alloy are preferable, being able to realize high saturation magnetization. Examples of Fe-based alloys include alloys containing Ni, Mn, Cu, or the like as the second component, such as a FeNi alloy, a FeMn alloy, and a FeCu alloy. Examples of Co-based alloys include alloys containing Ni, Mn, Cu, or the like as the second component, such as a CoNi alloy, a CoMn alloy, and a CoCu alloy. Examples of FeCo-based alloys include alloys containing Ni, Mn, Cu, or the like as the second component. Those second components are effective for reducing magnetic loss of core-shell particles and improve the high-frequency magnetic properties.

Among the magnetic metals, FeCo-based alloys are particularly preferable. The Co content in the FeCo is preferably 10 atomic % or more and 50 atomic % or less, to achieve thermal stability, oxidation resistance, and saturation magnetization of 2 tesla or higher. More preferably, the Co content in the FeCo is 20 atomic % or more and 40 atomic % or less, to further improve saturation magnetization.

Among the elements belonging to the second group, Al and Si have high solid solubility with Fe, Co, and Ni, which are the main components of the core portions, and contribute to improvement of the thermal stability of the core-shell particles. Therefore, Al and Si are preferable. Particularly, Al is preferable, because Al improves the thermal stability and the oxidation resistance. If Al and Si are contained at the same time, aggregation and grain growth of the core-shell particles are restrained, and properties such as the high-frequency magnetic permeability, the thermal stability, and the oxidation resistance are further improved. Therefore, containing Al and Si at the same time is more preferable. Also, those properties can be improved by adding another second-group element to the above described second-group element. Since an active metal element such as a rare-earth element is selected as the element to be added, aggregation and grain growth of the core-shell particles are restrained, and properties such as the high-frequency magnetic permeability, the thermal stability, and the oxidation resistance can be further improved. Therefore, an active metal element is preferable as the element to be added. For example, it is preferable to add a rare-earth element such as Y to an element containing at least one of Al and Si. Alternatively, the same effect as above can be expected, if the valence of the element to be added, which is another element belonging to the second group, is made to differ from the valence of the element belonging to the second group. Furthermore, the same effect as above can also be expected, if the radius of the atoms of the element to be added, which is another element belonging to the second group, is made larger than the radius of the atoms of the element belonging to the second group.

Carbon atoms or nitrogen atoms may be dissolved in the core portion material.

The compositions of the first-group and second-group elements contained in the core portions are analyzed in the following manner, for example. Examples of analysis methods include ICP (Inductively coupled plasma) emission spectrometry, TEM-EDX (Energy Dispersive X-ray Spectrometer), XPS (X-ray photoelectron Spectroscopy), and SIMS (Secondary Ion Mass Spectrometry). By the ICP emission spectrometry, the nonmagnetic metal composition such as Al of the core portions is checked by comparing the results of analyses carried out on the magnetic metal particle portions (the core portions) solved in weak acid or the like, the residues (the shell layers) solved in alkali or strong acid, and the entire particles. That is, the amount of the nonmagnetic metal in the core portions can be subjected to separation measurement. By the TEM-EDX, an electron beam is selectively emitted onto a core portion or a shell layer, and the constituent element ratio of each portion can be quantitated. By the XPS, the binding state between the respective elements forming a core portion or a shell layer can be examined.

The solid-solution state of the component belonging to the second group with respect to the component belonging to the first group contained in a core-shell particle can be determined from a lattice constant measured by XRD (X-ray Diffraction). For example, where Al or carbon is dissolved in Fe, the lattice constant of the Fe varies with the amount of the solid solution. In the case of bcc-Fe having nothing dissolved therein, the lattice constant is ideally approximately 2.86. However, if Al is dissolved in Fe, the lattice constant becomes greater. If approximately 5 atomic % of Al is dissolved, the lattice constant becomes greater by approximately 0.005 to 0.01. Where approximately 10 atomic % of Al is dissolved, the lattice constant becomes larger by approximately 0.01 to 0.02. Where carbon is dissolved in bcc-Fe, the lattice constant becomes larger. Where approximately 0.02 mass % of carbon is dissolved, the lattice constant becomes larger by approximately 0.001. In this manner, by carrying out XRD measurement on a core portion, the lattice constant of the magnetic metal is determined. Accordingly, a check can be readily made to determine whether solid-solving has occurred, and how much is dissolved, depending on the lattice constant. Alternatively, a check may be made to determine whether solid-solving has occurred, based on the diffraction pattern of particles measured by TEM.

The core portions may be polycrystalline or single-crystalline. However, the core portions are preferably single-crystalline. When a composite member containing core-shell particles containing single-crystalline core portions is used in a high-frequency device, the magnetization easy axes can be oriented, and accordingly, magnetic anisotropy can be controlled. Thus, the high-frequency properties can be made higher than those of the high-frequency magnetic material containing core-shell particles containing polycrystalline core portions.

The amount of the second-group element contained in the core portions is preferably 0.001 mass % or more and 20 mass % or less with respect to the amount of the first-group element. If the contained amount of each second-group element exceeds 20 mass %, the saturation magnetization of the core-shell particles might be degraded. The contained amount of the second-group element is preferably 1 mass % or more and 10 mass % or less, so as to achieve high saturation magnetization and solid solubility.

The mean particle size of the core portions is 1 nm or larger and 1000 nm or smaller, or preferably, 1 nm or larger and 100 nm or smaller, or more preferably, 10 nm or larger and 50 nm or smaller. If the mean particle size of the core portions is smaller than 10 nm, superparamagnetism might be generated, and the flux content might decrease. On the other hand, if the mean particle size exceeds 1000 nm, the eddy-current loss becomes larger in high-frequency regions, and the magnetic properties might be degraded in a target high-frequency region. If the particle size of the core portion becomes larger in a core-shell particle, a multi-domain structure as a magnetic structure is more stable than a single-domain structure in terms of energy. At this point, the core-shell particle of a multi-domain structure has poorer high-frequency properties of the magnetic permeability than those of a single-domain structure.

In view of the above, it is preferable to use core-shell particles each having single-domain structure, where the core-shell particles are used as s high-frequency magnetic member. The limit particle size of each core portion having a single-domain structure is approximately 50 nm or smaller, the mean particle size of the core portions is preferably 50 nm or smaller. In view of the above, the mean particle size of the core portions is 1 nm or larger and 1000 nm or smaller, or preferably, 1 nm or larger and 100 nm or smaller, or more preferably, 10 nm or larger and 50 nm or smaller.

(Shell Layers)

The above shell layers cover at least part of the core portions, and each contain at least an oxide layer, as described above. Each of the shell layer may further contain a carbon-containing material layer.

The forms of the oxide layer and the carbon-containing material layer in each of the shell layers are not particularly limited, but the oxide layer is preferably in close contact with core portion. Also, the ratio of the second-group metal element to the first-group magnetic metal is preferably higher in the oxide layer than in the core portion. This is because the oxidation resistance of the particle becomes higher at such a ratio.

(Shell Layer/Oxide Layer)

The above described oxide layers each contain at least one element among the second-group elements constituting the core portions. That is, the core portions and the oxide layers have a common second-group element. In the oxide layers, the common element with the core portions forms an oxide. The above oxide layers are preferably layers formed by oxidizing the second-group element of the core portions.

The thickness of each of the oxide layers is preferably in the range of 0.01 to 5 nm. If the thickness of each of the oxide layers is beyond that range, the composition ratio of the magnetic metal becomes lower, and the saturation magnetization of the particles might be degraded. If the thickness of each of the oxide layers is below that range, stabilization of the oxidation resistance cannot be expected from the oxide layers.

The amount of oxygen in the oxide layers is not particularly limited. However, where the amount of oxygen in the metal-containing particle aggregate is measured, the amount of oxygen is 0.5 mass % or more and 10 mass % or less with respect to the amount of the entire particles, or preferably, 1 mass % or more and 10 mass % or less, or more preferably, 2 mass % or more and 7 mass % or less. If the amount of oxygen is beyond that range, the composition ratio of the magnetic metal becomes lower, and the saturation magnetization of the particles might be degraded. If the amount of oxygen is below that range, stabilization of the oxidation resistance cannot be expected from the oxide layers.

The amount of oxygen is quantitated in the following manner. Where a carbon-containing material layer covers each magnetic particle metal surface, for example, a measurement sample that weighs 2 to 3 mg in a carbon container in an inert atmosphere such as a He gas is heated to approximately 2000° C. by high-frequency heating with the use of a Sn capsule as a combustion improver. In the oxygen measurement, the amount of oxygen can be calculated by detecting carbon dioxide generated as a result of a reaction between the oxygen in the sample and the carbon container due to the high-temperature heating. Where the magnetic particles are covered with an organic compound having its main chain made of hydrocarbon, temperature control is performed, and the combustion atmosphere is changed. In this manner, only the amount of oxygen in the oxygen layers is separately quantitated. Where the amount of oxygen in a first particle aggregate is 0.5 mass % or less, the proportion of the oxygen layer in each shell layer is smaller, and therefore, the heat resistance and the thermal reliability are poorer. Where the amount of oxygen in the first particle aggregate is 10 mass % or more, the detachability of the oxygen layers is higher.

(Shell Layer/Carbon-Containing Material Layer)

As the carbon-containing material layer forming part of each of the shell layers, it is possible to employ a hydrocarbon gas reaction product, a metal carbide, an organic compound, or the like.

By virtue of the existence of that layer, oxidation of the metal material in the core portions can be effectively restrained, and the oxidation resistance becomes higher.

The mean thickness of the carbon-containing material layers is 0.1 nm or more and 10 nm or less, or more preferably, 1 nm or more and 5 nm or less. Here, a "thickness" is the length along the straight line extending from the center of a core-shell particle to the outer rim of the core-shell particle. If the thickness of each of the carbon-containing material layers is made smaller than 1 nm, the oxidation resistance becomes insufficient. Furthermore, the resistance of the composite member becomes extremely lower, and eddy-current loss is readily generated. As a result, the high-frequency properties of the magnetic permeability might be degraded.

If the thickness of each of the carbon-containing material layers exceeds 10 nm, the filling rate of the core portions in the member becomes lower by the amount equivalent to the thickness of each of the shell layers when the desired member is produced by integrating the core-shell particles covered with the carbon-containing material layers. As a result, the saturation magnetization of the member might be degraded, and the magnetic permeability might become lower.

The thickness of each of the carbon-containing material layers can be determined through TEM observations.

In the above hydrocarbon gas reaction product, a material that decomposes and generates a hydrocarbon gas on the particle surfaces of the core portions is used as film.

The above hydrocarbon gas may be an acetylene gas, a propane gas, or a methane gas, for example. The reaction products are thought to contain carbon thin film, though not definitive.

Such a carbon-containing material layer preferably has reasonable crystallinity.

The crystallinity of a carbon-containing material layer is evaluated by assessing the crystallinity of the carbon-containing material layer at the vaporization temperature of hydrocarbon, to be specific. With the use of a device such as a TG-MS (thermogravimetric-mass spectroscopy) device, generation of hydrocarbon (mass number being 16, for example) is monitored through an analysis in a hydrogen gas flow under atmospheric pressure, and an assessment is made based on the temperature at which the generation of hydrocarbon becomes the largest. The above mentioned vaporization temperature of hydrocarbon preferably falls within the range of 300 to 650° C., and more preferably, falls within the range of 450 to 550° C. This is because, if the vaporization temperature of hydrocarbon is 650° C. or more, the carbon-containing material layers are too dense, and hinder formation of oxide layers. If the vaporization temperature is 300° C. or less, the carbon-containing material layers have too many defects, and facilitate excess oxidation.

The above carbon-containing material layers may be made of a metal carbide material. The carbide in this case may be a carbide belonging to the first or second element group forming the core portions. Especially, silicon carbide and iron carbide are preferable, being stable carbides and having appropriate thermal reliability.

The above carbon-containing material layers may be made of organic compounds. The organic compound layers may be formed on the surfaces of the above described hydrocarbon gas reaction product. An organic compound preferably has a main chain formed with an organic polymer or oligomer containing carbon, hydrogen, oxygen, or nitrogen.

The above organic compound material is solid at normal temperatures and pressures. The organic compound can be selected from organic polymers or oligomers, whether it is a natural compound or a synthetic compound. The polymers or oligombers of this embodiment can be obtained by known radical polymerization or polycondensation.

The above organic compound can be selected from homopolymers of polyorefins, polyvinyls, polyvinyl alcohols, polyesters, polyactic acids, polyglycolic acids, polystyrenes, polymethyl methacrylates, polyamides, polyurethanes, polycelluloses, and epoxy compounds, and copolymers of those materials. The organic compound can also be selected from polysaccharides made of natural polymers such as gelatin, pectin, and carrageenan.

Each shell layer made of such an organic compound preferably has a thickness of 2 nm or greater.

The oxygen permeability coefficient of the above organic compound is preferably $1 \times 10^{-17}$ [cm3(STP)·cm/cm2×s×Pa] at normal temperatures and pressures. If the oxygen permeability coefficient of the above organic compound is equal to or lower than the above value, formation of oxide layers does not progress in the course of formation of an oxide-carbon-metal particle aggregate, and property degradation might be caused. Therefore, an organic compound having such an oxygen permeability coefficient is not preferable.

An oxygen permeability coefficient can be measured by a known technique, such as gas chromatography of a differential pressure type compliant with JIS K7126-1 (differential pressure method). That is, a film of an organic compound is prepared, and measurement is carried out by pressurizing one side and depressurizing the other permeation side. An assessment can be made in this manner. At this point, the permeating gas is separated by gas chromatography, and the amount of permeating gas per hour is measured by a thermal conductivity detector (TCD) and a flame ionization detector (FID). In this manner, the oxygen permeability coefficient can be calculated.

In this embodiment, the oxide layers and the carbon-containing material layers in the shell layers have the following functions.

If each of the shell layers includes only a carbon-containing material layer, oxidation in the core portion rapidly progresses due to cracks or the like in the carbon-containing material layer, and heat generation is locally caused. Chain reaction oxidation involving the surrounding particles then progresses, resulting in aggregation and grain growth of core-shell particles.

If each of the shell layers includes only an oxide layer, unevenness is caused in part of the oxide composition. Therefore, there is a probability that there exists more portions in which oxide layers do not contain oxides of second-group metal elements but contain first-group elements. Oxides of second-group elements restrain element diffusion, and exhibit high protective performance for the core portions. On the other hand, oxides of first-group elements cause larger element diffusion than that by oxides of second-group elements, and are poorer in protective performance. Therefore, if the oxide layers contain a large amount of oxide of a first-group element, excess oxidation progresses in the core portions, and the function of the oxide layers as a magnetic material becomes weaker.

Where each of the shell layers appropriately includes an oxide layer and a carbon-containing material layer, high oxidation resistance of the core-shell particles can be maintained. Furthermore, as a shell layer exists on the surface of each core-shell particle, the core-shell particles are in contact with one another via the shell layers. Accordingly, the probability that the metals of the core portions form interfaces directly with one another becomes lower. Thus, aggregation and grain growth accompanying metal element diffusion do not easily occur. Also, a magnetic material that can reduce detachability of the oxide layers 21, excels in heat resistance and thermal stability of the magnetic properties over a long period of time is provided.

The ratio between the oxide layers and the carbon-containing material layers, or more preferably, the mass ratio between the oxide layer and the carbon-containing material layers, should fall within the range of 1:20 to 1:1.

[Second Embodiment: Method of Manufacturing Particle Aggregate]

A method of manufacturing a metal-containing particle aggregate of this embodiment is now described. The method of manufacturing the metal-containing particle aggregate includes the following steps.

1) The step of forming alloy particles by placing metal elements in a plasma, the metal elements being at least one magnetic metal element selected from the first group consisting of Fe, Co, and Ni, and at least one metal element selected from the second group consisting of Mg, Al, Si, Ca, Zr, Ti, Hf, Zn, Mn, rare-earth elements, Ba, and Sr (the alloy particle forming step).

2) The step of coating the surfaces of the alloy particles with a carbon-containing material (the carbon coating step).

3) The step of oxidizing the carbon-coated alloy particles in an oxygen-containing atmosphere (the oxidizing step).

4) The step of removing the carbon coating formed in the carbon coating step, which is carried out as needed (the decarbonizing step).

(Alloy Particle Forming Step)

Alloy particles to be core portions are preferably manufactured by utilizing a thermal plasma technique. The following is a description of a method of manufacturing the core portions with the use of a thermal plasma technique.

First, a gas containing argon (Ar) as a main component is introduced as a plasma generating gas into a high-frequency induction thermal plasma device, to generate plasma. A magnetic metal powder (a metal belonging to the first group) and a powder of a metal belonging to the second group are then sprayed into the plasma.

The step of forming the core portions is not limited to the thermal plasma technique. However, the step can be easily carried out by the thermal plasma technique, and nano-level material structures can be readily controlled. Also, large-scale synthesis can be performed. Therefore, the thermal plasma technique is preferable.

It should be noted that the metal powder to be sprayed into an argon gas can be magnetic metal powder that has a first-group magnetic metal and a second-group metal dissolved therein, and has a mean particle size of 1 μm or more and 10 μm or less. The powder having a mean particle size of 1 μm or more and 10 μm or less is synthesized by an atomizing technique or the like. With the use of the powder, core portions that are uniform in composition can be synthesized by the thermal plasma technique.

It should be noted that core portions having nitrogen dissolved therein are also preferable, having high magnetic anisotropy. To have nitrogen dissolved in the core portions, nitrogen may be introduced as a plasma generating gas together with argon, the present invention is not limited to that.

(Carbon Coating Step)

Next, the step of coating the core portions with a carbon-containing material layer is described.

In this step, the following methods may be used: (1) a method of having a hydrocarbon gas reacted on the surface of each core portion; (2) a method of forming a carbide on the surface of each core portion by having carbon reacted with a metal element in the core portions; and (3) a method of coating the surfaces of the core portions with the use of an organic compound having a main chain made of hydrocarbon.

According to the hydrocarbon gas reacting method as the first method, a carrier gas as well as a hydrocarbon gas are introduced into the material surface of each of the core portions, to cause a reaction. The surface of each of the core portions is coated with the reaction product. The hydrocarbon gas used herein is not particularly limited, but may be an acetylene gas, a propane gas, or a methane gas, for example.

Alloys containing Fe, Co, or Ni as a main component are known as catalysts for decomposing a hydrocarbon gas and precipitating carbon. Through this reaction, excellent carbon-containing material layers can be formed. That is, alloy particles containing Fe, Co, or Ni as a main components are brought into contact with a hydrocarbon gas at a temperature within such a appropriate temperature range as to exhibit a catalyst action. In this manner, carbon layers that prevent the core portions from being in contact with one another are obtained.

The temperature of reaction between the alloy particles containing Fe, Co, or Ni as a main component and the hydrocarbon gas varies with hydrocarbon gas species, but the preferred temperature of reaction is normally 200° C. or more and 1000° C. or less. If the temperature of reaction is lower than the above temperature, the amount of carbon precipitation is too small to form a coating. If the temperature of reaction is higher than the above temperature, the potential of carbon becomes too high, and excess precipitation occurs.

The temperature of reaction between the metal forming the shell layer and the hydrocarbon gas affects the stability of the coating carbon-containing material layers. A carbon-containing material layer formed at a high temperature of reaction turns into a hydrocarbon gas at a high temperature, and a carbon-containing material layer formed at a low temperature of reaction turns into a hydrocarbon gas at a low temperature.

In this manner, the stability of the carbon-containing material layers can be evaluated through a heating experiment in a hydrogen atmosphere. With the use of a device compliant with the TG-MS technique or the like, the vaporization temperature of hydrocarbon can be evaluated by measuring the temperature at which the gas concentration becomes the highest. For example, the temperature at which the amount of generation of a hydrocarbon gas with a mass number 16 becomes the largest is set as the thermal decomposition peak temperature. As the peak temperature becomes higher, the thermal stability of the carbon-containing material layers becomes higher. As the peak temperature becomes lower, the thermal stability of the carbon-containing material layers becomes lower.

Also, a raw material containing carbon and the raw material to form the shell layers may be sprayed at the same time. The raw material containing carbon used by this method may be pure carbon or the like, but the present invention is not limited to that.

The above described two methods are preferable, as the core portions can be coated with uniform carbon layers. However, the step of coating the core portion surfaces with carbon layers is not limited to the above described two methods.

The metal element in the core portion surfaces can be carbonized by a known technique. For example, the metal element in the core portion surfaces may react with an acetylene gas or a methane gas. By this method, thermally-stable carbon-containing material coating layers such as silicon carbide layers or iron carbide layers can be formed.

Various known methods can be used as the method of forming an organic compound coating. For example, there has been a physicochemical nanoencapsulation method and a chemical nanoencapsulation method. The physicochemical method can be selected from known physicochemical methods for nanoencapsulation, such as phase separation and coacervation. The chemical method can be selected from known chemical methods for nanoencapsulation, such as interfacial polycondensation, interfacial polymerization, polymerization in carrier medium, in-situ polycondensation, and emulsion polymerization. The organic-compound shell layers are bound to the core portions or the oxide layers through physical binding, without covalent binding.

By the above described method, magnetic metal cores (formed with metal particles stabilized by protective colloid), and core-shells coated with a polymer coating thicker than 2 nm can be obtained.

Also, by a method other than the above described methods, shells made of an organic compound can be formed by injecting magnetic metal nanoparticles into a polymer solution to be the shells, and homogenizing the nanoparticles. In industrial applications, this method is easy and therefore, is preferred.

By this method, particles do not need to exist independently of one another, and may exist as an aggregate having an organic compound layer of a desired thickness formed between the core particles made of a magnetic metal.

(Oxidizing Step)

The step of oxidizing the core portions coated with the carbon layers obtained in the above described step is now described. In this step, the core portions are oxidized in the presence of oxygen. The oxide layers may be formed with the interfaces between the core portions and the carbon-containing material layers, or the carbon-containing material layers may be partially oxidized and decomposed to form the oxide layers.

Through this step, the core portions are oxidized. However, the second-group metal contained in the core portions should preferably be oxidized. That is, at least one nonmagnetic metal selected from the group consisting of Mg, Al, Si, Ca, Zr, Ti, Hf, Zn, Mn, rare-earth elements, Ba, and Sr is oxidized to form an oxide layer on the surface of each of the core portions.

The oxygen atmosphere is not particularly limited, as long as it is the atmosphere, an oxidizing atmosphere such as oxygen or $CO_2$, a moisture-containing gas, or the like. Where oxygen is used, oxidation might rapidly progresses if the oxygen concentration is high, and the particles might aggregate due to excess heat generation. Therefore, it is preferable to use a gas containing 5% or less of oxygen in an inert gas such as an Ar gas or a $N_2$ gas. More preferably, the oxygen content is in the range of 10 ppm to 3%. However, the present invention is not particularly limited to the above.

The oxidation in the above described atmosphere may be performed in a heating environment. The temperature in that case is not particularly limited, but is preferably room temperature to about 300° C. This is because oxidation does not easily progress at temperatures lower than that, and oxidation rapidly progresses and the particles aggregate at temperatures higher than that.

The atmosphere gas and temperature used in the above described oxidizing step are preferably set in accordance with the balance between the stability and the thickness of the carbon-containing material layers. That is, where carbon-containing material layers having high stability are used, oxidation is preferably performed in a high-oxygen potential state. Where carbon-containing material layers having low stability are used, oxidation is preferably performed in a low-oxygen potential state.

Where thick carbon-containing material layers are used, oxidation is preferably performed in a high-oxygen potential state. Where thin carbon-containing material layers are used, oxidation is preferably performed in a low-oxygen potential state. Where oxidation is performed in a short period of time, the oxygen gas concentration may be about 10%. By the above manufacturing method, a metal-containing particle aggregate having shell-layers including carbon-containing material layers and oxide layers can be manufactured.

(Decarbonizing Step)

If the metal particle aggregate obtained through the above described steps is heated at several hundreds of degrees centigrade in a hydrogen atmosphere, for example, the carbon-containing material layers of the core-shell particles are removed. As a result, a metal-containing particle aggregate containing core-shell particles having at least part of the surface of each of the core portions coated with an oxide layer is obtained.

Where the above described organic compound such as an organic polymer or oligomer is removed, thermal decomposition is conducted in the presence of oxygen or hydrogen, and the organic compound can be then decomposed and removed.

The atmosphere in which the heat treatment is performed is not particularly defined, a reductive atmosphere that turns carbon into a hydrocarbon gas or an oxidizing atmosphere that turns carbon into a carbon oxide gas may be used.

The oxide layers made of a second-group element are normally stable at a temperature as high as about 1000° C. in a reductive or oxidizing atmosphere, and are not easily decomposed or gasified. On the other hand, carbon or carbide layers can be turned into a carbide gas and gasified when heated at several hundreds of degrees centigrade in a hydrogen atmosphere. Likewise, carbon or carbide layers can also be turned into a carbon oxide gas and gasified when heated at several hundreds of degrees centigrade in an oxygen atmosphere. Therefore, by suitably selecting a heating atmosphere, the oxide layers are left on, and only the carbon-containing material layers can be selectively removed.

The reductive atmosphere may be a nitrogen or argon atmosphere containing a reductive gas such as hydrogen or methane, for example. More preferably, the reductive atmosphere is a hydrogen gas atmosphere having a concentration of 50% or higher. This is because the carbon-containing material layers can be more efficiently removed in such a reductive atmosphere.

The oxidizing atmosphere may be a gas containing oxygen atoms such as oxygen, carbon dioxide, or water vapor, or a mixed gas of a gas containing the oxygen atoms, nitrogen, and argon.

The nitrogen or argon atmosphere containing a reductive gas is preferably a gas flow, and the flow rate is preferably 10 mL/min or higher.

The heating temperature in the reductive atmosphere is not particularly defined, and is preferably 100 to 800° C. Particularly, the heating temperature is preferably 300 to 800° C. If the heating temperature is lower than 100° C., a reduction reaction might progress at a lower speed. If the heating temperature exceeds 800° C., aggregation and grain growth of the precipitated metal fine particles might progress rapidly.

More preferably, the heating temperature is selected, with the stability of the carbon-containing material layers being the criterion. That is, where the carbon-containing material layers have high stability, the heating temperature should be relatively high. Where the carbon-containing material layers have low stability, the heating temperature should be relatively low.

The heat treatment temperature and time are not particularly limited, as long as they are suited at least for reducing the carbon-containing material layers.

The carbon content in the first particle aggregate after the carbon removing operation with a reductive gas is preferably 1 mass % or less. With this carbon content, the electrical influence can be lowered.

In the carbon removing operation in an oxidizing atmosphere, the following can be used: the air, a mixed gas of oxygen and argon, a mixed gas of oxygen and nitrogen, a moisturized argon gas or moisturized nitrogen gas having a controlled dew point, or the like.

The carbon removal in an oxidizing atmosphere is preferably performed at the lowest possible oxygen partial pressure. By a method other than the above method, the carbon-containing material layers can be removed with the use of a mixed gas containing hydrogen and oxygen atoms. In such a case, the carbon removal and the oxidation can progress at the same time. Accordingly, more stable oxide layers can be formed.

The mixed gas may be a mixed gas of hydrogen, argon, and oxygen, or a hydrogen gas having a controlled dew point, or the like, though not particularly limited.

The metal-containing particle aggregate obtained in the above manner also has surfaces covered with oxide layers, and aggregation does not easily occur.

Prior to the decarbonizing step, the oxygen permeability of the carbon-containing material layers can be controlled by exposing the metal-containing particle aggregate to plasma or an energy beam in an oxygen-containing atmosphere or an inert atmosphere and damaging the crystallinity of the carbon-containing material layers. In this manner, oxide layers with an appropriate thickness can be formed under the carbon-containing material layers. The energy beam is preferably an electron beam, an ion beam, or the like. The oxygen partial pressure in an oxygen-containing atmosphere that can be used is preferably 10 Pa or more and $10^3$ Pa or less. If the oxygen partial pressure exceeds that range, plasma, an electron beam, or an ion beam is not easily excited or generated. If the oxygen partial pressure is below that range, the effect of the plasma or energy beam exposure cannot be achieved.

[Third Embodiment: Composite Member]

The metal-containing particle aggregate manufactured according to the above described embodiment is mixed and molded with a binder such as a resin or an inorganic material, and is used as a composite member having a necessary shape.

This composite member is suitably used as a magnetic member in a device or the like.

The composite member is in the form of powder, a bulk form (such as pellets, a ring, or a rectangle), a film-like form such as a sheet, or the like, depending on the intended use. In the composite member, the core-shell particles do not easily aggregate. Accordingly, the core-shell particles exist uniformly in the composite member, and the composite member has excellent properties, particularly, excellent magnetic properties.

In the core-shell particles and high-frequency magnetic materials according to this embodiment, the material structures can be determined (analyzed) by SEM or TEM, the diffraction patterns (including solid-solution checks) can be determined (analyzed) by TEM diffraction or XRD, constituent element identification and quantitative analyses can be carried out (analyzed) by ICP emission spectrometry, XRF (X-ray fluorescent Spectrometry), EPMA (Electron Probe Micro-Analysis), EDX, SIMS, TG-MS, oxygen/carbon analysis by an infrared absorption method, or the like.

In the composite member of this embodiment, the volume ratio of the metal-containing particle aggregate to the entire sheet is preferably 10% or more and 70% or less. If the volume ratio of the metal-containing particle aggregate exceeds 70%, the electric resistance of the sheet becomes lower, and the eddy-current loss increases. As a result, the high-frequency magnetic properties might be degraded. If the volume ratio is made lower than 10%, the volume fraction of the magnetic metal becomes lower, and the saturation magnetization of the magnetic sheet also becomes lower. As a result, the magnetic permeability might become lower. The volume ratio of the binder phase is preferably 5% or more and 80% or less. If the volume ratio of the binder phase is made lower than 5%, the particles cannot bind to one another, and as a result, the strength of the sheet might become lower. If the volume ratio exceeds 80%, the volume ratio of the core portions to the sheet becomes lower, and as a result, the magnetic permeability might become lower.

In a case where a resin is used as the binder, the resin is a polyester resin, a polyethylene resin, a polystyrene resin, a polyvinyl chloride resin, a polyvinyl butyral resin, a polyurethane resin, a cellulose resin, an ABS resin, a nitrile-butadiene rubber, a styrene-butadiene rubber, an epoxy resin, a phenol resin, an amide resin, an imide resin, or a copolymer of those resins, though not particularly limited.

Instead of a resin, an inorganic material such as an oxide, a nitride, or a carbide may be used as the binder. Specifically, the inorganic material may be an oxide containing at least one metal selected from the group consisting of Mg, Al, Si, Ca, Zr, Ti, Hf, Zn, Mn, rare-earth elements, Ba, and Sr, AlN, $Si_3N_4$, SiC, or the like.

Although not particularly limited, the magnetic sheet can be manufactured by mixing the metal-containing particle aggregate with a resin and a solvent, and applying and drying the resultant slurry, for example. Also, the mixture of the metal-containing particle aggregate and a resin may be pressed and molded into a sheet or pellets. Further, the core-shell particles may be dispersed in the solvent, and may be deposited by electrophoresis or the like.

The magnetic sheet may have a stack structure. Being a stack structure, the magnetic sheet can easily have a greater thickness. Also, magnetic layers and nonmagnetic insulating layers are alternately stacked, so that the high-frequency magnetic properties can be improved. That is, each magnetic layer containing the metal-containing particle aggregate is formed into a sheet with a thickness of 100 μm or smaller, and the sheet-like magnetic layers and nonmagnetic insulating oxide layers with a thickness of 100 μm or smaller are alternately stacked. With this stack structure, the high-frequency magnetic properties are improved. As the thickness of each single magnetic layer is 100 μm or smaller, the influence of a demagnetizing field can be made smaller when a high-frequency magnetic field is applied in an in-plane direction. Accordingly, not only the magnetic permeability can be made higher, but also the high-frequency properties of the magnetic permeability are improved. Although the stacking method is not particularly limited, layers can be stacked by pressure-bonding, heating, or sintering stacked a plurality of magnetic sheets by a pressing technique or the like.

[Fourth Embodiment: Applications of Composite Member]

Figure 2:
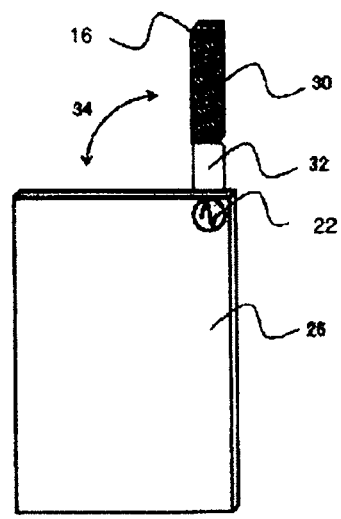
FIG. 2 is a diagram showing an antenna device.

FIG. 2 shows a configuration diagram of an antenna device according to this embodiment. The antenna device of this embodiment includes a circuit board 26, a spiral antenna element 30 connected to a feed terminal 22 provided on the circuit board 26, and a magnetic body 16 formed in the spiral antenna element 30. The magnetic body 16 is the first composite member of the first embodiment. Therefore, the same aspects as those of the first embodiment will not be described herein.

The circuit board 26 is connected to the spiral antenna element 30 via an antenna moving part 32 that is a connecting member. The circuit board 26 is a circuit board on which a wireless circuit (not shown) of a portable device is mounted, and is surrounded by a housing made of a nonconductive resin such as ABS or PC (polycarbonate). Further, the antenna moving part 32 may be of a type that can rotatably move 90° between a position parallel to the plane of paper and a position perpendicular to the parallel position, as indicated by the movable directions 34. Alternatively, the antenna moving part 32 may be of a pull-out type, a 360° rotating type, or the like.

The antenna element 30 may be covered with an antenna cover.

Figure 3:
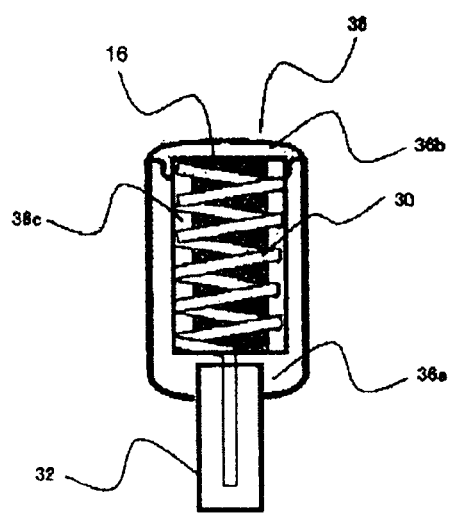
FIG. 3 is a diagram showing the antenna element of another antenna device.

FIG. 3 is a diagram for specifically explaining a case where the antenna element of this embodiment is covered with an antenna cover.

The antenna cover 36 covers the antenna element 30 and the magnetic body 16. The antenna cover 36 is made of a nonconductive resin, and includes a box unit 36a and a lid unit 36b. The box unit 36a has a hollow structure, and the spiral antenna element 30 is placed into an inner portion 36c of the hollow structure. The antenna moving unit 32 and the spiral antenna element 30 are electrically connected. In this condition, the lid unit 36b is connected to the box unit 36a by welding or with an adhesive agent, to form the antenna cover 36.

The principles of operations according to this embodiment are now described. As the antenna element 30 is spiral in form, the antenna length can be increased in a small area. Further, the inductance components become larger, and are affected by magnetic permeability, rather than by electric permittivity. By providing the magnetic body 16 in the spiral antenna element 30, the influence of high electric permittivity, particularly influence of large loss components, is made small, while the influence of magnetic permeability is large. That is, the decrease in radiation efficiency can be reduced with a material having a complex relative permeability with a small imaginary part, and the size of the device can be reduced by the real part of the complex relative permeability.

By placing the magnetic body 16 inside the spiral antenna element 30 as in this embodiment, the antenna element 30 can be made smaller in size, and the intensive loss in the circuit region can be made smaller than that in a case where a lumped-constant circuit is used. Accordingly, the radiation efficiency of the antenna device can be made higher.

Instead of the first composite member, the second composite member can be used. The same effects as above can be achieved with the use of the second composite member.

Furthermore, the above described composite member can be used in high-frequency magnetic parts and radiowave absorbers such as antennas, inductors, choke coils, filters, and transformers. To be used in such devices, various modifications may be made to the composite member. For example, mechanical processing such as polishing and cutting may be performed, or surface finishing may be performed as needed.

While certain embodiments have been described, these embodiments have been presented by way of example only, and are note intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

EXAMPLES

The following is a detailed description of examples that will be compared with comparative examples. Particle aggregates obtained in the examples and comparative examples were examined as to the following points: the composition (mass ratio (the total sum being 100)) of the contained core-shell particles, the mass ratio between oxygen and carbon, the mass (mass %) of oxygen contained in the particle aggregates, the mean diameter of the core portions, and the vaporization temperature of hydrocarbon. Table 1 shows the results. Also, composite members obtained by mixing the respective particle aggregates and binder phases were examined as to the real part of the magnetic permeability. Table 2 shows the results.

TABLE 1

| | core-shell particle composition (mass ratio) (ICP, gas analysis) | mass ratio between oxygen and carbon | oxygen mass (mass %) (gas analysis) | core portion particle size (nm) (XRD) prior to carbon decomposition | core portion particle size (nm) (XRD) after carbon decomposition | peak temperature of carbon-containing material layer decomposition (° C.) TG-MS |
|---|---|---|---|---|---|---|
| Example 1 | Fe:Co:Al:C:O = 53.9:25.9:5.1:11.7:3.4 | 3.4:11.7 | 3.4 | 9.29 | | 499 |
| Example 2 | material processed in Example 1 | | | | 17.67 | |
| Example 3 | material processed in Example 1 | | | | 15.0 | |
| Example 4 | Fe:Co:Si:C:O = 52.8:22.3:4:17.1:3.8 | 3.8:17.1 | 3.8 | 9.21 | | 520 |
| Example 5 | material processed in Example 4 | | | | 18.0 | |
| Example 6 | Fe:Co:Al = 58.9:31.0:10.1 | | | | 19.0 | |
| Example 7 | Fe:Co:Al:Si:C:O = 46.1:22.2:3.9:1.7:22.9:3.2 | 3.2:22.9 | 3.2 | 9.0 | | 539 |
| Example 8 | material processed in Example 7 | | | | 18.1 | |
| Example 9 | Fe:Co:Al:C:O = 45.4:22.1:10.8:18.3:3.4 | 3.4:18.3 | 3.4 | 9.1 | | 567 |
| Example 10 | material processed in Example 9 | | | | 19.9 | |
| Example 11 | Fe:Co:Al:Y:C:O = 45.6:22.4:6.4:0.6:21.9:3.1 | 3.1:21.9 | 3.1 | 9.0 | | 566 |
| Example 12 | material processed in Example 11 | | | | 19.7 | |
| Example 13 | Fe:Co:Al:C:O = 52.1:25.0:4.9:17.4:0.6 | 0.6:17.4 | 0.6 | 9.1 | | 620 |
| Example 14 | material processed in Example 13 | | | | 19.1 | |
| Comparative example 1 | Fe:Co:Al:C:O = 53.9:25.9:5.1:11.7:<0.2 | 0.15:11.7 | <0.2 | 9.20 | | 630 |
| Comparative example 2 | material processed in Comparative example 1 | | | | 23.7 | |
| Comparative example 3 | Fe:Co:Al:C:O = 54.8:24.5:3.79:15.7:1.2 | 1.2:15.7 | 1.2 | 9.78 | | 660 |
| Comparative example 4 | material processed in Comparative example 3 | | | | 24.1 | |
| Comparative example 5 | Fe:Co:C:O = 57.3:25.0:17.3:<0.2 | 0.17:17.3 | <0.2 | 9.3 | | 470 |
| Comparative example 6 | material processed in Comparative example 5 | | | | 38 | |

TABLE 2

|  | properties of high-frequency magnetic material magnetic permeability real part μ' (1 GHz or lower) |
| --- | --- |
| Example 1 | 5.4 |
| Example 2 | 5.7 |
| Example 3 | 5.5 |
| Example 4 | 5.3 |
| Example 5 | 5.6 |
| Example 6 | 5.7 |
| Example 7 | 5.5 |
| Example 8 | 6.0 |
| Example 9 | 5.2 |
| Example 10 | 5.6 |
| Example 11 | 5.2 |
| Example 12 | 5.9 |
| Example 13 | 5.1 |
| Example 14 | 5.8 |
| Comparative example 1 | 4.9 |
| Comparative example 2 | 4.7 |
| Comparative example 3 | 4.6 |
| Comparative example 4 | 4.8 |
| Comparative example 5 | 4.3 |
| Comparative example 6 | 4.5 |

Example 1

Argon is introduced as a plasma generating gas at 40 L/min into a chamber of a high-frequency induction thermal plasma device, to generate plasma. A Fe powder having a mean particle size of 10 μm, a Co powder having a mean particle size of 10 μm, and an Al powder having a mean particle size of 3 μm are sprayed as raw materials at 3 L/min, together with argon (a carrier gas), into the plasma in the chamber, so that Fe:Co:Al becomes 69:31:5 in mass ratio.

At the same time, a methane gas as a raw material of the carbon coating is introduced together with an Ar carrier gas into the chamber, and the gas temperature and the powder temperature are controlled. In this manner, magnetic metal particles having FeCoAl alloy particles coated with carbon are obtained.

The carbon-coated magnetic metal particles are oxidized for about 5 minutes, and an aggregate of core-shell particles each coated with a carbon-containing material layer and an oxide layer is obtained.

By TEM, the carbon-containing material layers and the oxide layers are observed on the surfaces of the FeCoAl cores.

The mean particle size of the core portions is 9.29 nm, and the oxygen content is 3.4 mass %. The oxygen analysis is carried out with the use of a gas analysis device (TC-600, manufactured by LECO Corporation) in the following manner. A measurement sample that weighs 2 to 3 mg in a carbon container is heated to approximately 2000° C. in a He gas atmosphere by high-frequency heating with the use of a Sn capsule as a combustion improver. In the oxygen measurement, the amount of oxygen is calculated by detecting carbon dioxide generated as a result of a reaction caused between the oxygen in the sample and the carbon container by the high-temperature heating.

The thermal stability of the carbon-containing material layers of this sample is examined by TG-MS. A hydrogen gas of 99% or higher in degree of purity is introduced at a flow rate of 200 mL/min under atmospheric pressure, and the temperature is raised at 20° C./min. As a result, the peak of the mass number 16 originated from a hydrocarbon gas is detected, and the peak (the vaporization temperature of hydrocarbon) appears in the neighborhood of 499° C.

The core-shell magnetic material and a resin are mixed at a ratio of 100:10, and are formed into a thick film to serve as an evaluation sample.

Example 2

The core-shell particles of Example 1 yet to be mixed with a resin are introduced into an electric furnace, and a carbon-containing material layer decomposing process is carried out at 650° C., with a hydrogen gas of 99% in concentration being introduced at 500 mL/min. The core-shell particles are then cooled to room temperature, and are oxidized in an oxygen-containing atmosphere, to form an aggregate of core-shell particles.

The obtained oxide-metal particle aggregate includes core portions and oxide layers, and the mean particle size of the core portions in the core-shell particles is 17.67 nm.

By TEM, oxide layers containing FeCoAlO as a main component are observed on the surfaces of FeCoAl cores.

Also, oxide particles that are formed with Al—O (with FeCo partially dissolved therein) and have a mean particle size of 10±3 nm exist between the core-shell particles. The Al/(Fe.Co) in the oxide particles is larger than the Al/(Fe.Co) in the oxide coating phase. The number of oxide particles is about 50% of the number of the core-shell particles.

The core-shell magnetic material and a resin are mixed at a ratio of 100:10, and are formed into a thick film to serve as an evaluation sample.

Example 3

The core-shell particles of Example 1 yet to be mixed with a resin are introduced into an electric furnace, and a carbon-containing material layer decomposing and oxide coating process is carried out at 100° C., with an oxygen-argon mixed gas of 5% in oxygen concentration being introduced at 500 mL/min. The core-shell particles are then cooled to room temperature, and are turned into an aggregate of core-shell particles.

The mean particle size of the core portions in the obtained core-shell particles is 15.0 nm.

By TEM, carbon-containing material layers and FeCoAlO oxide layers are observed on the surfaces of FeCoAl cores.

Also, oxide particles that are formed with Al—O (with FeCo partially dissolved therein) and have a mean particle size of 10±3 nm exist between the core-shell particles. The Al/(Fe.Co) in the oxide particles is larger than the Al/(Fe.Co) in the oxide coating phase. The number of oxide particles is about 50% of the number of the core-shell particles.

The core-shell magnetic material and a resin are mixed at a ratio of 100:10, and are formed into a thick film to serve as an evaluation sample.

Example 4

Argon is introduced as a plasma generating gas at 40 L/min into a chamber of a high-frequency induction thermal plasma device, to generate plasma. A Fe powder having a mean particle size of 10 μm, a Co powder having a mean particle size of 10 μm, and an Si powder having a mean particle size of 5 μm are sprayed as raw materials at 3 L/min, together with argon (a carrier gas), into the plasma in the chamber, so that Fe:Co:Si becomes 69:31:4 in mass ratio. At the same time, a methane gas as a raw material of the carbon coating is introduced together with an Ar carrier gas into the chamber, and the gas temperature and the powder temperature are controlled. In this manner, an aggregate of magnetic metal particles having FeCoSi alloy particles coated with carbon is obtained.

The carbon-coated magnetic metal particles are oxidized for about 5 minutes, and an aggregate of core-shell particles each coated with a carbon-containing material layer and an oxide layer is obtained.

By TEM, the carbon-containing material layers and the oxide layers are observed on the surfaces of the FeCoSi cores, and also, silicon carbide is partially observed on the surfaces of the FeCoSi cores.

The mean particle size of the core portions is 9.21 nm, and the oxygen content is 3.8 mass %.

The thermal stability of the carbon-containing material layers of this sample is examined by TG-MS. A hydrogen gas of 99% or higher in degree of purity is introduced at a flow rate of 200 mL/min under atmospheric pressure, and the temperature is raised at 20° C./min. As a result, the vaporization temperature of hydrocarbon appears in the neighborhood of 520° C.

The core-shell magnetic material and a resin are mixed at a ratio of 100:10, and are formed into a thick film to serve as an evaluation sample.

Example 5

The core-shell particles of Example 4 yet to be mixed with a resin are introduced into an electric furnace, and a carbon-containing material layer decomposing process is carried out at 650° C., with a hydrogen gas of 99% in concentration being introduced at 500 mL/min. The core-shell particles are then cooled to room temperature, and are oxidized in an oxygen-containing atmosphere, to form a complex of core-shell particles.

The obtained oxide-metal particle aggregate includes core portions and oxide layers, and the mean particle size of the core portions in the core-shell particles is 18.0 nm.

By TEM, FeCoSiO oxide layers are observed on the surfaces of FeCoSi cores.

Also, oxide particles that are formed with Si—O (with FeCo partially dissolved therein) and have a mean particle size of 10±3 nm exist between the magnetic metal particles. The Si/(Fe.Co) in the oxide particles is larger than the Si/(Fe.Co) in the oxide coating phase. The number of oxide particles is about 50% of the number of the oxide-coated core-shell particles.

The core-shell magnetic material and a resin are mixed at a ratio of 100:10, and are formed into a thick film to serve as an evaluation sample.

Example 6

As in Example 1, argon is introduced as a plasma generating gas at 40 L/min into a chamber of a high-frequency induction thermal plasma device, to generate plasma. A Fe powder having a mean particle size of 10 μm, a Co powder having a mean particle size of 10 μm, and an Al powder having a mean particle size of 3 μm are sprayed as raw materials at 3 L/min, together with argon (a carrier gas), into the plasma in the chamber, so that Fe:Co:Al becomes 69:31:5 in mass ratio. In this manner, magnetic nanoparticles are formed.

The magnetic nanoparticles are then put into an acetone solution that has an oxygen permeability coefficient of 5× $10^{-15}$ [cm3(STP)·cm/cm2×s×Pa] and contains 5 mass % of polyethylene terephthalate in an Ar atmosphere. After the solution is milled and stirred, acetone is removed, and magnetic nanoparticles coated with polyethylene terephthalate are obtained.

The magnetic nanoparticles are left for 24 hours to obtain a sample, and the sample is introduced into an electric furnace. An organics decomposing process is then carried out at 650° C., with a hydrogen gas of 99% in concentration being introduced at 500 mL/min. The sample is then cooled to room temperature, to form a complex of core-shell particles.

The obtained oxide-metal particle aggregate includes core portions and oxide layers, and the mean particle size of the core portions in the core-shell particles is 19.0 nm.

By TEM, FeCoAlO oxide layers are observed on the surfaces of FeCoAl cores.

The core-shell magnetic material and a resin are mixed at a ratio of 100:10, and are formed into a thick film to serve as an evaluation sample.

Example 7

Argon is introduced as a plasma generating gas at 40 L/min into a chamber of a high-frequency induction thermal plasma device, to generate plasma. A Fe powder having a mean particle size of 10 μm, a Co powder having a mean particle size of 10 μm, and an Al powder and a Si powder having a mean particle size of 3 μm are sprayed as raw materials at 3 L/min, together with argon (a carrier gas), into the plasma in the chamber, so that Fe:Co:Al:Si becomes 69:31:5.6:2.4 in mass ratio.

At the same time, a methane gas as a raw material of the carbon coating is introduced together with an Ar carrier gas into the chamber, and the gas temperature and the powder temperature are controlled. In this manner, magnetic metal particles having FeCoAlSi alloy particles coated with carbon are obtained.

The carbon-coated magnetic metal particles are oxidized for about 5 minutes, and an aggregate of core-shell particles each coated with a carbon-containing material layer and an oxide layer is obtained.

By TEM, the carbon-containing material layers and the oxide layers are observed on the surfaces of the FeCoAlSi cores. The mean particle size of the core portions is 9.0 nm, and the oxygen content is 3.2 mass %.

The thermal stability of the carbon-containing material layers of this sample is examined by TG-MS. A hydrogen gas of 99% or higher in degree of purity is introduced at a flow rate of 200 mL/min under atmospheric pressure, and the temperature is raised at 20° C./min. As a result, the vaporization temperature of hydrocarbon appears in the neighborhood of 539° C.

The core-shell magnetic material and a resin are mixed at a ratio of 100:10, and are formed into a thick film to serve as an evaluation sample.

Example 8

The core-shell particles of Example 7 yet to be mixed with a resin are introduced into an electric furnace, and a carbon-containing material layer decomposing process is carried out at 650° C., with a hydrogen gas of 99% in concentration being introduced at 500 mL/min. The core-shell particles are then cooled to room temperature, and are oxidized in an oxygen-containing atmosphere, to form an aggregate of core-shell particles.

The obtained oxide-metal particle aggregate includes core portions and oxide layers, and the mean particle size of the core portions in the core-shell particles is 18.1 nm.

The core-shell magnetic material and a resin are mixed at a ratio of 100:10, and are formed into a thick film to serve as an evaluation sample.

Example 9

Argon is introduced as a plasma generating gas at 40 L/min into a chamber of a high-frequency induction thermal plasma device, to generate plasma. A Fe powder having a mean particle size of 10 μm, a Co powder having a mean particle size of 10 μm, and an Al powder having a mean particle size of 5 μm are sprayed as raw materials at 3 L/min, together with argon (a carrier gas), into the plasma in the chamber, so that Fe:Co:Al becomes 69:31:10 in mass ratio. At the same time, a methane gas as a raw material of the carbon coating is introduced together with an Ar carrier gas into the chamber, and the gas temperature and the powder temperature are controlled. In this manner, an aggregate of magnetic metal particles having FeCoAl alloy particles coated with carbon is obtained.

The carbon-coated magnetic metal particles are oxidized for about 5 minutes, and an aggregate of core-shell particles each coated with a carbon-containing material layer and an oxide layer is obtained.

By TEM, the carbon-containing material layers and part of the oxide layers are observed on the surfaces of the FeCoAl cores.

The mean particle size of the core portions is 9.1 nm, and the oxygen content is 3.4 mass %.

The thermal stability of the carbon-containing material layers of this sample is examined by TG-MS. A hydrogen gas of 99% or higher in degree of purity is introduced at a flow rate of 200 mL/min under atmospheric pressure, and the temperature is raised at 20° C./min. As a result, the vaporization temperature of hydrocarbon appears in the neighborhood of 567° C.

The core-shell magnetic material and a resin are mixed at a ratio of 100:10, and are formed into a thick film to serve as an evaluation sample.

Example 10

The core-shell particles of Example 9 yet to be mixed with a resin are introduced into an electric furnace, and a carbon-containing material layer decomposing process is carried out at 800° C., with a hydrogen gas of 99% in concentration being introduced at 500 mL/min. The core-shell particles are then cooled to room temperature, and are oxidized in an oxygen-containing atmosphere, to form a complex of core-shell particles.

The obtained oxide-metal particle aggregate includes core portions and oxide layers, and the mean particle size of the core portions in the core-shell particles is 19.9 nm.

By TEM, FeCoAlO oxide layers are observed on the surfaces of FeCoAl cores.

Also, oxide particles that are formed with Al—O (with FeCo partially dissolved therein) and have a mean particle size of 10±3 nm exist between the magnetic metal particles. The Al/(Fe.Co) in the oxide particles is larger than the Al/(Fe.Co) in the oxide coating phase. The number of oxide particles is about 50% of the number of the oxide-coated core-shell particles.

The core-shell magnetic material and a resin are mixed at a ratio of 100:10, and are formed into a thick film to serve as an evaluation sample.

Example 11

Argon is introduced as a plasma generating gas at 40 L/min into a chamber of a high-frequency induction thermal plasma device, to generate plasma. A Fe powder having a mean particle size of 10 μm, a Co powder having a mean particle size of 10 μm, an Al powder having a mean particle size of 3 μm, and a $Y_2O_3$ powder having a mean particle size of 1 μm are sprayed as raw materials at 3 L/min, together with argon (a carrier gas), into the plasma in the chamber, so that Fe:Co:Al:Y becomes 69:31:9.4:1.1 in mass ratio.

At the same time, a methane gas as a raw material of the carbon coating is introduced together with an Ar carrier gas into the chamber, and the gas temperature and the powder temperature are controlled. In this manner, magnetic metal particles having FeCoAlY alloy particles coated with carbon are obtained.

The carbon-coated magnetic metal particles are oxidized for about 5 minutes, and an aggregate of core-shell particles each coated with a carbon-containing material layer and an oxide layer is obtained.

By TEM, the carbon-containing material layers and the oxide layers are observed on the surfaces of the FeCoAlY cores. The mean particle size of the core portions is 9.0 nm, and the oxygen content is 3.1 mass %.

The thermal stability of the carbon-containing material layers of this sample is examined by TG-MS. A hydrogen gas of 99% or higher in degree of purity is introduced at a flow rate of 200 mL/min under atmospheric pressure, and the temperature is raised at 20° C./min. As a result, the vaporization temperature of hydrocarbon appears in the neighborhood of 566° C.

The core-shell magnetic material and a resin are mixed at a ratio of 100:10, and are formed into a thick film to serve as an evaluation sample.

Example 12

The core-shell particles of Example 11 yet to be mixed with a resin are introduced into an electric furnace, and a carbon-containing material layer decomposing process is carried out at 800° C., with a hydrogen gas of 99% in concentration being introduced at 500 mL/min. The core-shell particles are then cooled to room temperature, and are oxidized in an oxygen-containing atmosphere, to form an aggregate of core-shell particles.

The obtained oxide-metal particle aggregate includes core portions and oxide layers, and the mean particle size of the core portions in the core-shell particles is 19.7 nm.

The core-shell magnetic material and a resin are mixed at a ratio of 100:10, and are formed into a thick film to serve as an evaluation sample.

Example 13

Argon is introduced as a plasma generating gas at 40 L/min into a chamber of a high-frequency induction thermal plasma device, to generate plasma. A Fe powder having a mean particle size of 10 μm, a Co powder having a mean particle size of 10 μm, and an Al powder having a mean particle size of 5 μm are sprayed as raw materials at 3 L/min, together with argon (a carrier gas), into the plasma in the chamber, so that Fe:Co:Al becomes 69:31:5 in mass ratio. At the same time, a methane gas as a raw material of the carbon coating is introduced together with an Ar carrier gas into the chamber, and the gas temperature and the powder temperature are controlled. In this manner, an aggregate of magnetic metal particles having FeCoAl alloy particles coated with carbon is obtained.

The carbon-coated magnetic metal particles are oxidized for about 5 minutes, and an aggregate of core-shell particles each coated with a carbon-containing material layer and an oxide layer is obtained.

By TEM, the carbon-containing material layers and part of the oxide layers are observed on the surfaces of the FeCoAl cores.

The mean particle size of the core portions is 9.1 nm, and the oxygen content is 0.6 mass %.

The thermal stability of the carbon-containing material layers of this sample is examined by TG-MS. A hydrogen gas of 99% or higher in degree of purity is introduced at a flow rate of 200 mL/min under atmospheric pressure, and the temperature is raised at 20° C./min. As a result, the vaporization temperature of hydrocarbon appears in the neighborhood of 620° C. Since the carbon decomposition in the carbon-containing material layers progresses at a relatively high temperature, it is estimated that the carbon-containing material layers have high crystallinity than the carbon-containing material layers of Example 1, Example 4, Example 7, Example 9, and Example 11.

Example 14

The core-shell particles of Example 13 yet to be mixed with a resin are introduced into an electric furnace having a plasma generating mechanism, and a plasma exposing process is carried out in an oxygen-containing argon atmosphere having an oxygen partial pressure adjusted to $1 \times 10^2$ Pa. After that, a carbon-containing material layer decomposing process is carried out at 800° C., with a hydrogen gas of 99% in concentration being introduced at 500 mL/min. The core-shell particles are then cooled to room temperature, and are oxidized in an oxygen-containing atmosphere, to form a complex of core-shell particles. Here, the plasma exposing process is carried out to lower the crystallinity of the carbon-containing material layers, and facilitate decomposition of the carbon-containing material.

The obtained oxide-metal particle aggregate includes core portions and oxide layers, and the mean particle size of the core portions in the core-shell particles is 19.1 nm.

The core-shell magnetic material and a resin are mixed at a ratio of 100:10, and are formed into a thick film to serve as an evaluation sample.

Comparative Example 1

Argon is introduced as a plasma generating gas at 40 L/min into a chamber of a high-frequency induction thermal plasma device, to generate plasma. A Fe powder having a mean particle size of 10 μm, a Co powder having a mean particle size of 10 μm, and an Al powder having a mean particle size of 3 μm are sprayed as raw materials at 3 L/min, together with argon (a carrier gas), into the plasma in the chamber, so that Fe:Co becomes 70:30 in atomic ratio, and the ratio of Al to FeCo is 5 mass %.

At the same time, a methane gas as a raw material of the carbon coating is introduced together with an Ar carrier gas into the chamber. As a result, an aggregate of core-shell particles having FeCoAl alloy particles coated with carbon is obtained.

The thermal stability of the carbon-containing material layers of this sample is examined by TG-MS. A hydrogen gas of 99% or higher in degree of purity is introduced at a flow rate of 200 mL/min under atmospheric pressure, and the temperature is raised at 20° C./min. As a result, the mass number 16 originated from a hydrocarbon gas is detected, and its peak appears in the neighborhood of 630° C.

By an inert gas fusion method and an infrared absorption method, the oxygen content in this sample is calculated to be 0.2 mass % or lower with respect to the entire sample. By TEM, no oxide layers are observed in the shells.

The core-shell magnetic material and a resin are mixed at a ratio of 100:10, and are formed into a thick film to serve as an evaluation sample.

Comparative Example 2

The core-shell particles of Comparative Example 1 are introduced into an electric furnace, and a carbon-containing material layer decomposing process is carried out at 650° C., with a hydrogen gas of 99% in concentration being introduced at 500 mL/min. The core-shell particles are then cooled to room temperature, and are oxidized in an oxygen-containing atmosphere, to form an oxide-coated core-shell magnetic material.

The obtained oxide-coated core-shell magnetic material includes magnetic metal particles and an oxide. The mean particle size of the magnetic metal particles in the core-shell magnetic metal particles is 23.7 nm, and the thickness of each oxide layer is 1.0±0.3 nm. The magnetic metal particles as the cores are formed with Fe—Co—Al, and the oxide layers are formed with Fe—Co—Al—C.

The core-shell magnetic material and a resin are mixed at a ratio of 100:10, and are formed into a thick film to serve as an evaluation sample.

Comparative Example 3

Argon is introduced as a plasma generating gas at 40 L/min into a chamber of a high-frequency induction thermal plasma device, to generate plasma. A Fe powder having a mean particle size of 10 μm, a Co powder having a mean particle size of 10 μm, and an Al powder having a mean particle size of 3 μm are sprayed as raw materials at 3 L/min, together with argon (a carrier gas), into the plasma in the chamber, so that Fe:Co becomes 70:30 in atomic ratio, and the ratio of Al to FeCo is 5 mass %.

At the same time, a methane gas as a raw material of the carbon coating is introduced together with an Ar carrier gas into the chamber. As a result, an aggregate of core-shell particles having FeCoAl alloy particles coated with carbon is obtained. Here, the pressure and temperature in the chamber are controlled to increase the crystallinity of the carbon-containing material layers.

The thermal stability of the carbon-containing material layers of this sample is examined by TG-MS. A hydrogen gas of 99% or higher in degree of purity is introduced at a flow rate of 200 mL/min under atmospheric pressure, and the temperature is raised at 20° C./min. As a result, the mass number 16 originated from a hydrocarbon gas is detected, and its peak appears in the neighborhood of 660° C.

By an inert gas fusion method and an infrared absorption method, the oxygen content in this sample is calculated to be 1.2 mass % with respect to the entire sample. By TEM, no oxide layers are observed in the shells.

The core-shell magnetic material and a resin are mixed at a ratio of 100:10, and are formed into a thick film to serve as an evaluation sample.

Comparative Example 4

The core-shell particles of Comparative Example 3 are introduced into an electric furnace, and a carbon-containing material layer decomposing process is carried out at 700° C., with a hydrogen gas of 99% in concentration being introduced at 500 mL/min. The core-shell particles are then cooled to room temperature, and are oxidized in an oxygen-containing atmosphere, to form an oxide-coated core-shell magnetic material.

The obtained oxide-coated core-shell magnetic material includes magnetic metal particles and an oxide. The mean particle size of the magnetic metal particles in the core-shell magnetic metal particles is 24.1 nm, and the thickness of each oxide layer is 1.0±0.3 nm. The magnetic metal particles as the cores are formed with Fe—Co—Al, and the oxide layers are formed with Fe—Co—Al—O.

The core-shell magnetic material and a resin are mixed at a ratio of 100:10, and are formed into a thick film to serve as an evaluation sample.

Comparative Example 5

Argon is introduced as a plasma generating gas at 40 L/min into a chamber of a high-frequency induction thermal plasma device, to generate plasma. A Fe powder having a mean particle size of 10 μm and a Co powder having a mean particle size of 10 μm are sprayed as raw materials at 3 L/min, together with argon (a carrier gas), into the plasma in the chamber, so that Fe:Co becomes 70:30 in atomic ratio.

At the same time, a methane gas as a raw material of the carbon coating is introduced together with an Ar carrier gas into the chamber. As a result, an aggregate of core-shell particles having FeCo alloy particles coated with carbon is obtained. The thermal stability of the carbon-containing material layers of this sample is examined by TG-MS. A hydrogen gas of 99% or higher in degree of purity is introduced at a flow rate of 200 mL/min under atmospheric pressure, and the temperature is raised at 20° C./min. As a result, the mass number 16 originated from a hydrocarbon gas is detected, and its peak appears in the neighborhood of 470° C.

By an inert gas fusion method and an infrared absorption method, the oxygen content in this sample is calculated to be 0.2 mass % or lower with respect to the entire sample. By TEM, no oxide layers are observed in the shells.

Comparative Example 6

The core-shell particles of Comparative Example 5 are introduced into an electric furnace, and a carbon-containing material layer decomposing process is carried out at 700° C., with a hydrogen gas of 99% in concentration being introduced at 500 mL/min. The core-shell particles are then cooled to room temperature, and are oxidized in an oxygen-containing atmosphere, to form an oxide-coated core-shell magnetic material.

The obtained oxide-coated core-shell magnetic material includes magnetic metal particles and an oxide. The mean particle size of the magnetic metal particles in the core-shell magnetic metal particles is 38 nm, and the thickness of each oxide layer is 0.3±0.1 nm. The magnetic metal particles as the cores are formed with Fe—Co, and the oxide layers are formed with Fe—Co—O.

The core-shell magnetic material and a resin are mixed at a ratio of 100:10, and are formed into a thick film to serve as an evaluation sample.

The real parts μ' of magnetic permeabilities are measured in the following manner. With the use of a PMM-9G1 system (manufactured by Ryowa Electronics Co., Ltd.), the induced voltage values and the impedance values are measured at 1 GHz when the air is in the background and when samples are provided. The real parts μ' of magnetic permeabilities are calculated from the induced voltage values and the impedance values. It should be noted that the samples used here are 4×4×0.5 mm in size.

In the core-shell particles according to the embodiments, and in the aggregates of core-shell particles formed by the manufacturing methods according to the embodiments, the particles are dispersed in a preferred manner, and aggregation and grain growth of the particles are restrained. Accordingly, the core-shell particles and the aggregates of core-shell particles are materials with high magnetic permeability and low loss. Where aggregation and grain growth of particles can be restrained, low loss can be maintained even if the particles are arranged at high density. Accordingly, high magnetic permeability can be readily achieved. As can be seen from the results shown in Table 2, the magnetic permeabilities of the materials of Examples 1 through 13 using core-shell particles that include carbon-containing material layers having vaporization temperatures of hydrocarbon within the range of 300 to 650° C., and having oxygen contents within the range of 0.5 to 10 mass % are higher than the magnetic permeabilities of the materials of Comparative Examples 1 through 6. Between Example 7 and Example 1, the magnetic permeability is higher in Example 7. Between Example 8 and Example 2, the magnetic permeability is higher in Example 8. This is because the high-frequency magnetic permeability can be made higher where Al and Si, which belong to the second group, are contained at the same time to restrain aggregation and grain growth of core-shell particles. Likewise, between Example 11 and Example 9, the magnetic permeability is higher in Example 11. Between Example 12 and Example 10, the magnetic permeability is higher in Example 12. This is because the high-frequency magnetic permeability can be made higher where Al, which belongs to the second group, or Y, which is a rare-earth additional element belonging to the second group, are contained at the same time to restrain aggregation and grain growth of core-shell particles.

Although embodiments and Examples of the present inventions have been described so far, those embodiments are merely exemplary, and are not intended to limit the scope of the invention. Those novel embodiments and Examples can be applied to various other forms, and various omissions, replacements, and modifications may be made to them, without departing from the scope of the invention. Those embodiments, Examples, and their modifications are within the scope and spirit of the invention, and are also included in the inventions disclosed in the claims and their equivalents.

What is claimed is:

1. A metal-containing particle aggregate comprising:
   a plurality of core-shell particles each comprising
      a core portion containing at least one magnetic metal element selected from a first group consisting of Fe, Co, and Ni, and at least one metal element selected from a second group consisting of Mg, Al, Si, Ca, Zr, Ti, Hf, Zn, Mn, rare-earth elements, Ba, and Sr; and
      a shell layer including an oxide layer and a carbon-containing material layer, the oxide layer covering at least part of the core portion and containing at least one metal element that belongs to the second group and is contained in the core portion,
   wherein the mass ratio between carbon and oxygen (carbon/oxygen) of the core-shell particles is 3.4-29.

2. The metal-containing particle aggregate according to claim 1, wherein an amount of oxygen contained in the metal-containing particle aggregate is 0.5 mass% or more and 10 mass% or less with respect to an amount of the particle aggregate.

3. The metal-containing particle aggregate according to claim 1, wherein the carbon-containing material layer is a product of decomposition of a hydrocarbon gas.

4. The metal-containing particle aggregate according to claim 1, wherein, when the carbon-containing material layer is heated in a hydrogen atmosphere, a vaporization temperature of hydrocarbon of the carbon-containing material layer is 300° C. or more and 650° C. or less.

5. The metal-containing particle aggregate according to claim 4, wherein an amount of oxygen contained in the metal-containing particle aggregate is 0.5 mass% or more and 10 mass% or less with respect to an amount of the particle aggregate.

6. The metal-containing particle aggregate according to claim 1, wherein the carbon-containing material layer is made of an organic compound.

7. The metal-containing particle aggregate according to claim 1, wherein the organic compound of claim 6 has a main chain formed with one of an organic polymer and an organic oligomer each containing one of carbon, hydrogen, oxygen, and nitrogen.

8. The metal-containing particle aggregate according to claim 7, wherein an oxygen permeability coefficient of the carbon-containing material layer made of the organic compound is equal to or greater than $1 \times 10^{-17}$[cm3(STP)·cm/cm2×s×Pa].

9. The metal-containing particle aggregate according to claim 1, further comprising:
oxide particles containing at least one element that belongs to the second group and is contained in the core portion, wherein the ratio (atomic ratio) of the element belonging to the first group to the element belonging to the second group in the oxide particles is higher than the ratio (atomic ratio) of the element belonging to the first group to the element belonging to the second group in the oxide layer.

10. A method of manufacturing a metal-containing particle aggregate, comprising:
forming a core portion that is an alloy particle containing at least one magnetic metal element selected from a first group consisting of Fe, Co, and Ni, and at least one metal element selected from a second group consisting of Mg, Al, Si, Ca, Zr, Ti, Hf, Zn, Mn, rare-earth elements, Ba, and Sr;
forming a carbon-containing material layer on a surface of the alloy particle, to form a carbon-coated particle; and
oxidizing the carbon-coated particle in an oxygen-containing atmosphere to produce an oxidized particle, wherein the mass ratio between carbon and oxygen (carbon/oxygen) of the oxidized particle is 3.4-29.

11. The method of manufacturing a metal-containing particle aggregate according to claim 10, wherein the forming the core portion includes placing at least one magnetic metal element and at least one metal element into a plasma to form the core portion that is the alloy particle, the at least one magnetic metal element being selected from the first group consisting of Fe, Co, and Ni, the at least one metal element being selected from the second group consisting of Mg, Al, Si, Ca, Zr, Ti, Hf, Zn, Mn, rare-earth elements, Ba, and Sr.

12. The method of manufacturing a metal-containing particle aggregate according to claim 10, wherein the forming the carbon-containing material layer includes coating a surface of the alloy particle with carbon in a carbon-containing atmosphere.

13. The method of manufacturing a metal-containing particle aggregate according to claim 10, wherein the forming the carbon-containing material layer includes coating a surface of the alloy particle with an organic compound which optionally has a main chain formed with one of an organic polymer and an organic oligomer each containing one of carbon, hydrogen, oxygen, and nitrogen.

14. The method of manufacturing a metal-containing particle aggregate according to claim 10, further comprising removing the carbon-containing material layer after the oxidizing the carbon-coated alloy particle.

15. The method of manufacturing a metal-containing particle aggregate according to claim 14, further comprising performing a hydrogen heat treatment or a hydrogen plasma treatment to remove the carbon-containing material layer after the metal-containing particle aggregate is exposed to at least one energy beam in a gas atmosphere containing oxygen atoms, the at least one energy beam being selected from the group consisting of a plasma, an electron beam, and an ion beam, the hydrogen heat treatment or the hydrogen plasma treatment being performed between the oxidizing and the removing the carbon-containing material layer.

16. The method of manufacturing a metal-containing particle aggregate according to claim 15, wherein an oxygen partial pressure in the oxygen-containing gas atmosphere is 10 Pa or more and $10^3$ Pa or less.

* * * * *